(No Model.) 2 Sheets—Sheet 1.

J. V. DAVIS.
AUTOMATIC ELECTRIC WEIGHING SCALE.

No. 449,468. Patented Mar. 31, 1891.

ATTEST.
J. Henry Kaiser
Edw. A. Byrn

INVENTOR.
John V. Davis
BY Munn
ATTORNEYS (No Model.) 2 Sheets—Sheet 2.

J. V. DAVIS.
AUTOMATIC ELECTRIC WEIGHING SCALE.

No. 449,468. Patented Mar. 31, 1891.

ATTEST.
J. Henry Kaiser
Edw. W. Byrn

INVENTOR.
John V. Davis
BY Munn & Co
ATTORNEYS

UNITED STATES PATENT OFFICE.

JOHN V. DAVIS, OF ASHLAND, KENTUCKY, ASSIGNOR TO THE AUTOMATIC ELECTRIC SCALE COMPANY, OF SAME PLACE.

AUTOMATIC ELECTRIC WEIGHING-SCALE.

SPECIFICATION forming part of Letters Patent No. 449,468, dated March 31, 1891.

Application filed May 17, 1890. Serial No. 352,152. (No model.)

*To all whom it may concern:*

Be it known that I, JOHN V. DAVIS, of Ashland, in the county of Boyd and State of Kentucky, have invented new and Improved Automatic Electric Weighing-Scales, of which the following is a full, clear, and exact description.

The object of my invention is to provide an automatic electrical weighing-scale in which the poise runs out to the point of exact balance on the scale-beam from the mere application of the load, thus automatically indicating the weight and, if desired, printing or recording the same.

Figure 1:
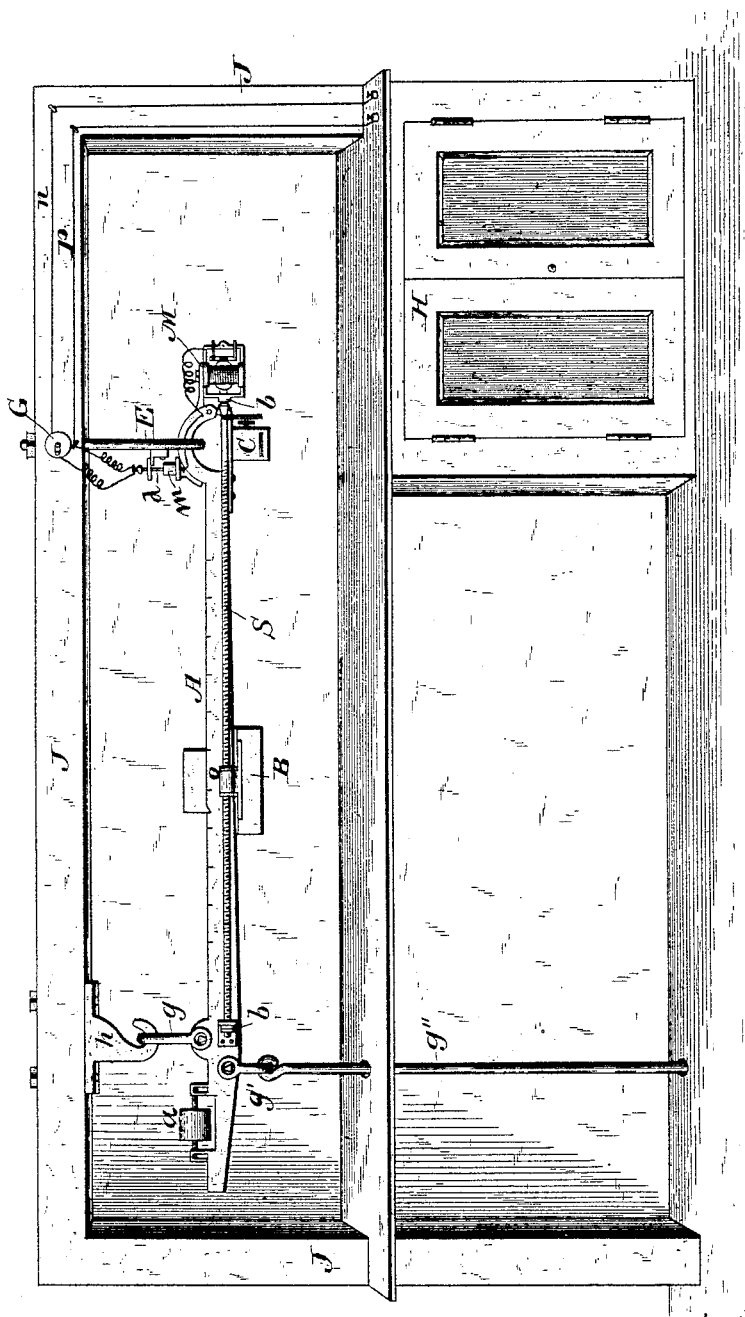
Figure 3:
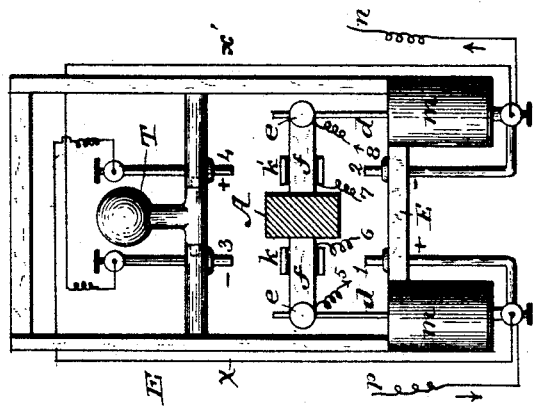
Figure 2:
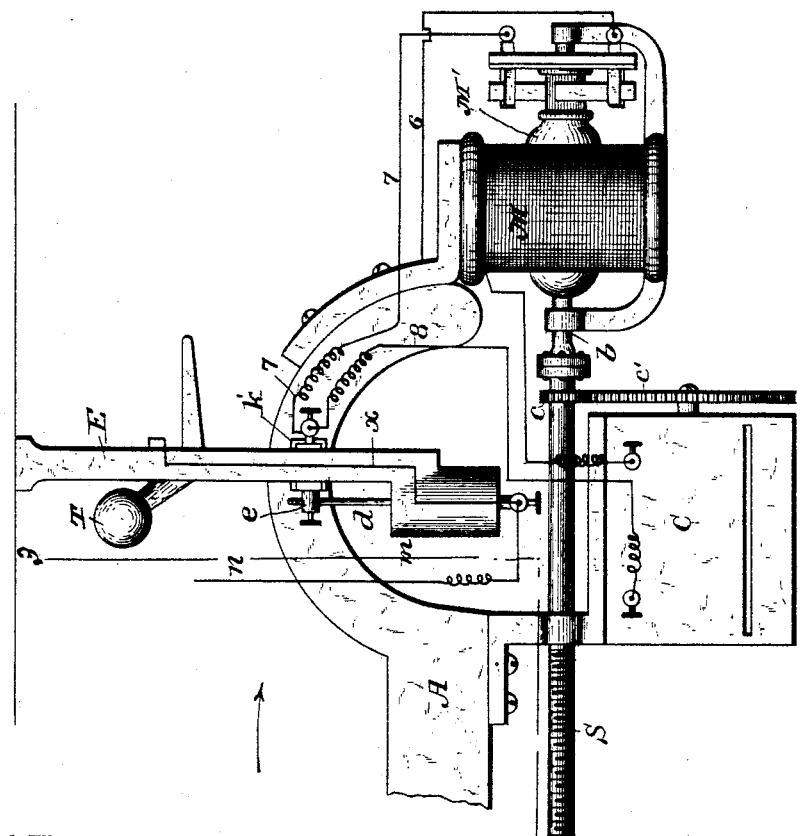

Figure 1 is a front elevation, partly in perspective, showing my invention applied to a scale-beam and the case or frame. Fig. 2 is an enlarged side view, in detail, of the end of the scale-beam, carrying the electric motor and screw-shaft, and also the stationary frame carrying the electrical contacts; and Fig. 3 is a sectional view through line 3 3 of Fig. 2, looking in the direction of the arrow, the upper portion of the devices only being shown.

In the drawings, J represents an inclosing frame or case, to the upper portion of which is bolted the suspension-hook $h$, upon which the scale-beam is hung by means of the link $g$.

A is the scale-beam, which is provided at its outer end with a goose-neck playing in a stationary frame or yoke B. Upon the opposite side of its fulcrum the scale-beam is connected by link $g'$ with the rod $g''$, which extends down to the platform mechanism below, which is of the ordinary construction and need not be shown.

To the scale-beam A, in position parallel with its upper edge, is applied a screw-shaft S, which is mounted on journals on the scale-beam and moves with the scale-beam in its oscillation.

B is the poise which moves along the scale-beam. This poise has a portion $o$, provided with an internal screw-thread which embraces the screw-shaft, whereby the rotation of the screw-shaft causes the poise to traverse the scale-beam in one direction or the other, according to the direction of the revolution of the screw-shaft.

H is a cupboard or inclosure within the case J, which serves to contain a galvanic battery, whose circuit-wires $n$ and $p$ extend up along the case to a switch G, and thence down to contact-points 1 2 3 4, carried by the yoke or frame E, within which the goose-neck of the scale-beam vibrates.

M M' is an electric motor of the shunt-circuit type. This electric motor is fastened to and carried upon the scale-beam by means of a bracket screwed to the goose-neck, and its armature M' has its rotary shaft $b$ arranged in alignment with the screw-shaft S and coupled thereto for axial rotation together.

At the lower portion of the frame E, within which the goose-neck vibrates, there are two mercury-cups $m\ m$, one on each side of the scale-beam. To binding-posts on the bottoms of the mercury-cups the two circuit-wires $n$ and $p$ are respectively connected, and at these points the current is divided or shunted, part going to the field-magnets of the motor in continuous flow and part going to the armature intermittingly through the contacts.

In the mercury-cups are arranged rods $d\ d$, which are supported by binding-screws $e\ e$ from a cross-bar $f$, carried by the scale-beam A. These rods move up and down in the mercury as the scale-beam vibrates and never leave the mercury. They therefore form conductors that carry the current constantly to the terminal wires 5 8 of the field-magnets M.

Upon the cross-bar $f$ of the scale-beam are mounted plates $k$ and $k'$, which extend over the cross-bar $f$ at top and bottom and are insulated therefrom and from each other. These contact-plates $k\ k'$ are respectively connected with the terminal wires 6 and 7 of the armature M' of the electric motor. Immediately beneath the plates $k\ k'$ are two stationary insulated contacts 1 and 2, connected, respectively, to the mercury-cups, and above the plates $k\ k'$ are two insulated contacts 3 and 4, which are connected with the mercury-cups by wires $x\ x'$, which are crossed so as to reverse the poles—*i. e.*, the poles of the contacts 3 4 are exactly reversed in position to those of contacts 1 2.

The operation of my improved scales is as follows: When the load is placed upon the platform, if the poise is not as far out on the scale-beam as the weight indicates, the scale-beam rises and throws the contacts $k\ k'$ into electrical connection with the contacts 3 and 4 above. This throws the current into the wires 6 7 of the armature, and the field-magnets being constantly charged the electric-motor armature and screw-shaft S revolve in a direction which causes the poise to move outwardly until the poise balances the beam, at which time the contacts $k\ k'$ leave the contacts 3 4 and break the circuit through the armature, and the motor, screw-shaft, and poise stop at a perfect balance, the charged field-magnets holding the armature against further revolution from momentum. If the poise be too far out on the scale-beam when the load is placed on, the scale-beam will be down and the armature-contacts $k\ k'$ will be upon the contacts 1 2, and as the poles of these contacts 1 2 are reversed to those of 3 4 the motor will be revolved in the opposite direction and the poise will be carried back until the scale-beam rises to a balance, when the armature shunt-circuit will be broken, as before described, and the poise stopped with the scale-beam to balance. In this way it will be seen that the scale is made to quickly and surely weigh its load in a perfectly automatic manner. By reversing the poles of the contacts above and below the scale-beam, as shown, it will be seen that the same instrumentalities are made to automatically work the poise backward or forward, and by connecting the armature and field-magnets in shunt-circuit two desirable results are obtained, for when the armature-circuit is broken the main circuit is not broken, being always preserved through the field-magnets, so that sparking between the terminals or contacts of the armature is avoided. In the second place, when the armature-circuit is broken at the moment of balance of the poise and scale-beam the momentum of the armature does not continue to turn the screw-shaft and throw the poise to a false position; but the continuously-charged field-magnets grip and hold by their attractive influence the armature as soon as its circuit is broken, thus holding it stationary as soon as a balance is obtained. To throw the scales out of action, the switch G may be turned by hand to short circuit the current, or the load may be made to automatically effect this result. A trunnioned detent T may also be turned down against the scale-beam to prevent its vibrations.

In making use of my invention I do not confine myself to locating the motor and its contacts at the outer end or goose-neck of the scale-beam, as it is when so located necessary to balance its weight by a counterpoise $a$ upon the opposite side of the fulcrum upon the short arm of the scale. In some applications of my invention I prefer to locate the electric motor and its contacts upon the short arm of the scale-beam, in which location its weight is opposed to that of the long arm of the scale-beam.

If desired to record or print the weight indicated automatically, I may place a printing-recorder C in a loop of the wire 8, leading to the field-magnets. This recorder is rotated by gears $c\ c'$ from the screw-shaft and is controlled by an electro-magnetic mechanism within, which I do not claim as new and need not describe.

Having thus described my invention, what I claim, and desire to secure by Letters Patent, is—

1. The combination, with the scale-beam and its poise, of an electric motor arranged in shunt-circuit with a part of the current going through the field-magnets constantly and a part through the armature, contacts for making and breaking the armature-circuit between the points of balance, and gears connecting the electric motor with the poise for adjusting the latter, substantially as described.

2. The combination, with a scale-beam and its poise and an electric motor mounted upon the scale-beam in fixed relation thereto and geared to the poise to adjust it, as described, of a set of contacts carried by the scale-beam and connected to the poles of the motor, and two sets of contacts, one set arranged above and the other below the scale-beam, the two sets having their poles reversed, substantially as shown and described.

3. The combination, with a scale-beam and its poise, of a shunt-circuit electric motor mounted upon the scale-beam, gears for connecting the motor with the poise for adjusting it, a set of mercury-cups for establishing connection between the outside circuit-wires and the field-magnets of the motor, and a set of contacts with reversed poles for transmitting a reversed current to the armature of the motor, substantially as shown and described.

4. The combination, with scale-beam A and its poise B, of the screw-shaft S, the electric motor M M', having its armature-shaft aligned with and connected to the screw-shaft, the stationary frame E, having circuit-wires $n\ p$ and $x\ x'$, mercury-cups $m\ m$, and stationary reverse contacts 1 2 3 4, the cross-bar $f$ on the scale-beam bearing rods $d\ d$, dipping in the mercury-cups and having insulated contacts $k\ k'$, connected to the poles of the armature and playing between the stationary contacts, substantially as shown and described.

JOHN V. DAVIS.

Witnesses:
EDW. W. BYRN,
SOLON C. KEMON.